(12) United States Patent
Kim et al.

(10) Patent No.: US 10,731,971 B1
(45) Date of Patent: Aug. 4, 2020

(54) METHOD OF MEASURING 3D PROFILE

(71) Applicant: INDUSTRY-ACADEMIC COOPERATION FOUNDATION, DANKOOK UNIVERSITY, Yongin-si, Gyeonggi-do (KR)

(72) Inventors: Daekeun Kim, Seoul (KR); Se Won Kang, Seongnam-si (KR); Inkeon Ryu, Busan (KR)

(73) Assignee: INDUSTRY-ACADEMIC COOPERATION FOUNDATION, DANKOOK UNIVERSITY, Yongin-si, Gyeonggi-do (KR)

(*) Notice: Subject to any disclaimer, the term of this patent is extended or adjusted under 35 U.S.C. 154(b) by 0 days.

(21) Appl. No.: 16/684,604

(22) Filed: Nov. 15, 2019

(30) Foreign Application Priority Data

Jan. 25, 2019 (KR) .................. 10-2019-0009916

(51) Int. Cl.
*G01B 11/24* (2006.01)
*G06T 7/55* (2017.01)
(Continued)

(52) U.S. Cl.
CPC ............ *G01B 11/24* (2013.01); *G01B 11/002* (2013.01); *G01B 11/22* (2013.01); *G01B 11/25* (2013.01); *G06T 7/55* (2017.01); *G06T 7/571* (2017.01)

(58) Field of Classification Search
CPC ......... G06K 2209/40; G06K 2209/401; G06K 9/2018; G06K 9/2027; G06K 9/2036; G06K 9/2054; G06K 2009/2045; G06T 7/50; G06T 7/507; G06T 7/55; G06T 7/557; G06T 7/564; G06T 7/571; G06T 7/586;
(Continued)

(56) References Cited

U.S. PATENT DOCUMENTS

| | | | | |
|---|---|---|---|---|
| 4,443,706 A * | 4/1984 | DiMatteo | ............... | G01B 11/24 250/558 |
| 5,878,152 A * | 3/1999 | Sussman | ............ | G01B 11/2513 382/106 |
| 7,019,826 B2 * | 3/2006 | Vook | ..................... | G06T 7/0002 250/559.34 |
| 7,382,471 B2 * | 6/2008 | Franke | ................... | G01B 11/25 356/604 |

(Continued)

FOREIGN PATENT DOCUMENTS

| KR | 10-1337888 B1 | 12/2013 |
|---|---|---|
| KR | 10-1479734 B1 | 1/2015 |
| KR | 10-2018-0101612 A | 9/2018 |

*Primary Examiner* — Gordon J Stock, Jr.
(74) *Attorney, Agent, or Firm* — Revolution IP, PLLC

(57) ABSTRACT

A 3D profile measurement method includes: forming structured light having a sinusoidal intensity pattern by forcing light to pass through a grating filter and an objective lens; acquiring a structured illumination image of a measurement object by photographing the measurement object with the structured light projected thereon at predetermined intervals in a height direction of the measurement object and a uniform illumination image of the measurement object is acquired by photographing the measurement object under illumination with general light rather than the structured light; generating a Hi-Lo image by using the structured illumination image and the uniform illumination image at each height of the measurement object; extracting height-specific intensity of respective pixels in the plural Hi-Lo images; and generating a 3D profile of the measurement object based on the obtained surface position.

13 Claims, 9 Drawing Sheets

(51) Int. Cl.
*G01B 11/25* (2006.01)
*G01B 11/00* (2006.01)
*G01B 11/22* (2006.01)
*G06T 7/571* (2017.01)

(58) Field of Classification Search
CPC ....... G06T 7/593; G01B 11/002; G01B 11/22; G01B 11/24; G01B 11/2408; G01B 11/2416; G01B 11/2425; G01B 11/25; G01B 11/2513; G01B 11/2518; G01B 11/2522; G01B 11/2527; G01B 11/2531; G01B 11/2536
See application file for complete search history.

(56) References Cited

U.S. PATENT DOCUMENTS

| | | | |
|---|---|---|---|
| 7,440,590 B1 * | 10/2008 | Hassebrook | G01B 11/2513 345/582 |
| 8,199,335 B2 * | 6/2012 | Mitsumoto | G01B 11/245 356/601 |
| 9,161,014 B2 * | 10/2015 | Prantl | G01B 11/2513 |
| 10,078,907 B2 * | 9/2018 | Yoshikawa | G06T 5/00 |
| 10,332,268 B2 * | 6/2019 | Higaki | G06T 7/50 |
| 10,415,958 B2 * | 9/2019 | Nakatsukasa | G06T 7/70 |
| 10,634,487 B2 * | 4/2020 | Zhao | G01B 11/2518 |
| 2014/0111616 A1 * | 4/2014 | Blayvas | G01B 11/2513 348/46 |
| 2015/0124073 A1 * | 5/2015 | Fujishima | G02B 21/16 348/79 |
| 2019/0323831 A1 * | 10/2019 | Natori | H04N 13/128 |
| 2020/0090355 A1 * | 3/2020 | Hall | G01B 11/25 |

* cited by examiner (a)

(b)

(a)

(b)

(a)

(b)

(a)      (b)

(a)      (b)

METHOD OF MEASURING 3D PROFILE

FIELD

The present invention relates to a 3D profile measurement method and, more particularly, to a method of measuring a 3D profile of a measurement object by acquiring plural 2D images of the measurement object at respective heights of the measurement object and performing digital post-processing of the plural 2D images acquired at the respective heights.

BACKGROUND

With the development of micro- and nanotechnology, there is increasing demand for measurement of the surface shape of a fine structure.

Surface shape measurement methods may be divided into contact and non-contact measurement methods based on the type of measurement. Thereamong, the non-contact measurement method is an optical measurement method using light, and causes less physical damage to a specimen while allowing faster measurement than the contact measurement method and thus is widely used throughout the industry.

Various types of microscopes have been developed to realize such ultrahigh resolution imaging. In particular, some microscopes adopt a method of maximizing the number of distinguishable image pixels by increasing the resolution of an image sensor, such as CCD/CMOS, a method of minimizing chromatic aberration generated by a lens such as an aspherical lens, and a method of increasing resolution by correcting an image acquired by an image sensor through digital processing.

Recently, there has been proposed a composite 3D image acquisition apparatus that acquires plural images and performs digital post-processing of the plural images. Examples of a method employed by such an image acquisition apparatus may include a high dynamic range (HDR) technique that acquires plural images under different exposures, followed by digital post-processing to improve optical depth, a structured illumination modulation (SIM) technique that acquires multiple pattern images having different phase contrasts by imparting a predetermined pattern to light incident on a measurement object, followed by comparison between the pattern images to improve resolution.

What the HDR technique and the SIM technique have in common is that plural images having certain characteristics imparted thereto are first acquired and then a single image having improved resolution is acquired through digital processing. However, the HDR technique has a problem in that it takes a relatively long time to acquire plural mages, and the SIM technique has problems of high cost and low image processing speed due to sequential acquisition of plural images despite the advantage of allowing acquisition of a high-resolution 3D image.

RELATED LITERATURE

Patent Document (Patent document 1) Korean Patent Publication No. 10-1479734 (published on Jan. 6, 2015)

SUMMARY

Embodiments of the present invention have been conceived to overcome such a problem in the art and it is an aspect of the present invention to provide a 3D profile measurement method that can measure a 3D profile of a measurement object with high precision at high speed using a relatively small number of 2D images through digital post-processing of the acquired 2D images.

In accordance with one aspect of the present invention, a 3D profile measurement method includes: a structured light formation step in which structured light having a sinusoidal intensity pattern is formed by forcing light to pass through a grating filter and an objective lens; an image acquisition step in which a structured illumination image of a measurement object is acquired by photographing the measurement object with the structured light projected thereon at predetermined intervals in a height direction of the measurement object and a uniform illumination image of the measurement object is acquired by photographing the measurement object under illumination with general light rather than the structured light; a Hi-Lo image generation step in which a Hi-Lo image is generated using the structured illumination image and the uniform illumination image at each height of the measurement object; a surface position determination step in which height-specific intensity of respective pixels in the plural Hi-Lo images is extracted, the pixels being located at the same point in a given plane in the height direction, and a height corresponding to the highest intensity value is determined as a surface position of the measurement object; and a profile generation step in which a 3D profile of the measurement object is generated based on the obtained surface position.

The structured light formation step may include adjusting a pattern pitch of the grating filter to form the structured light having the sinusoidal intensity pattern.

The structured light formation step may include adjusting a magnification or numerical aperture of the objective lens to form the structured light having the sinusoidal intensity pattern.

The structured light having the sinusoidal intensity pattern may have a contrast of 0.6 or more.

The surface position determination step may include performing curve fitting on the extracted height-specific intensity values and determining a height corresponding to a point having the highest intensity value on a curve obtained by curve fitting as the surface position of the measurement object.

The surface position determination step may include selecting a height corresponding to the highest intensity value among the heights, the height-specific intensity of which is extracted, as a highest intensity height, and performing curve fitting on an intensity value at the highest intensity height and intensity values at a predetermined number of plural heights adjacent to and above and below the highest intensity height.

The 3D profile measurement method may further include: a measurement error correction step in which a 3D profile of a standard measurement object, a 3D profile of which is known in advance, is regenerated through the structured light formation step, the image acquisition step, the Hi-Lo image generation step, the surface position determination step, and the profile generation step; and, upon occurrence of an error between the regenerated 3D profile and the known 3D profile, a determination is made that the error is due to operational characteristics of a measurement apparatus and the 3D profile of the measurement object is corrected through application of a value of the error to the 3D profile of the measurement object.

The 3D profile measurement method may further include: a leveling correction step in which, when the 3D profile of the measurement object is inclined at a certain angle with respect to a horizontal reference plane, a determination is made that the measurement object is in an incorrect measurement position and the angle of inclination is reduced to zero.

The 3D profile measurement method may further include: a 3D image correction step in which a 3D image generated based on first and second images of the same measurement object is corrected, the first and second images being formed by plural imaging units using respective light sources emitting first and second wavelength light components having different wavelengths, wherein the 3D image correction step mat include: a first correction step in which a size difference between the first and second images due to a wavelength difference between the first and second wavelength light components and an optical alignment error is corrected; a second correction step in which a difference in focus position between the first and the second images due to a wavelength difference between the first and second wavelength light components and an optical alignment error is corrected; a third correction step in which a difference in translational position between the first and second images due to the optical alignment error is corrected; and a fourth correction step in which a difference in rotational position between the first and the second images due to the optical alignment error is corrected.

The first correction step may include: a scale correction coefficient calculation step in which a scale correction coefficient between the first and second images is calculated based on physical distance between patterns and the number of patterns per given area in each of the first and second images; and a scale correction step in which the size difference between the first and second images is corrected by applying the scale correction coefficient to one of the first and second images.

The second correction step may include: a contrast detection step in which an image position having the highest contrast is detected from each of the first and second images; and a contrast-based correction step in which a z-axis (height) position of one of the first and second images is corrected based on a contrast of the other image.

The third correction step may include: a translational cross-correlation coefficient calculation step in which translational cross-correlation coefficients through translation along the x- and y-axes between the first and second images are calculated; and a translation position correction step in which one of the first and second images is translated by a translation distance along the x- and y-axes corresponding to a translational cross-correlation coefficient having the highest value among the calculated translational cross-correlation coefficients.

The fourth correction step may include: a rotational cross-correlation coefficient calculation step in which rotational cross-correlation coefficients through rotation about the z-axis between the first and second images are calculated; and a rotational position correction step in which one of the first and second images is rotated by a rotation amount about the z-axis corresponding to a rotational cross-correlation coefficient having the highest value among the calculated rotational cross-correlation coefficients.

The 3D profile measurement method according to the present invention allows high-speed measurement of a high-resolution 3D profile, which has better 3D resolution than that measured by typical optical microscopes, using a relatively small number of 2D images.

In addition, the 3D profile measurement method according to the present invention can measure a 3D profile of a measurement object at high speed with high precision using a relatively inexpensive existing optical system through digital post-processing of plural acquired images, thereby allowing total inspection of produced measurement objects while significantly shortening inspection time.

DRAWINGS

DETAILED DESCRIPTION

Figure 1:
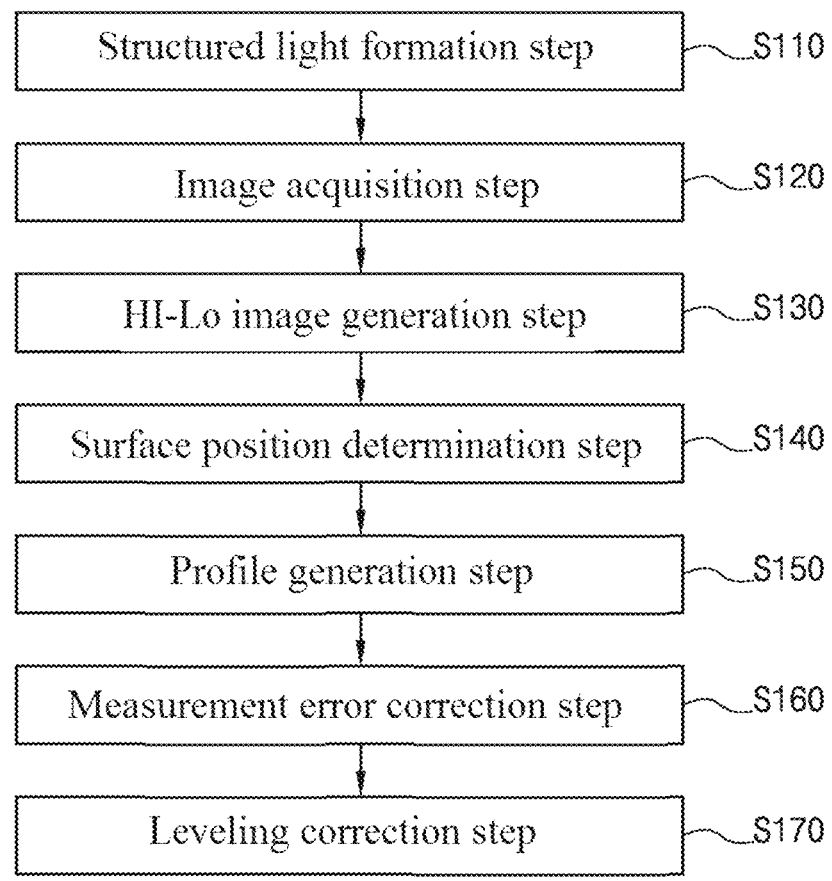
FIG. 1 is a flowchart of a 3D profile measurement method according to one embodiment of the present invention.

Hereinafter, embodiments of the present invention will be described with reference to the accompanying drawings. It should be noted that like components will be denoted by like reference numerals throughout the specification and the accompanying drawings. In addition, descriptions of details apparent to those skilled in the art will be omitted for clarity.

This research was supported by the projects as below.

[Project number] 2014R1A1A1005583

[Ministry] Ministry of Science, ICT and Future Planning

[Management agency] National Research Foundation of Korea

[Program name] Basic Research in Science & Engineering

[Project name] The Development of High-Speed Imaging Technology for Measuring 3D Profile in the Functional Surface

[Contribution ratio] 1/1

[Supervision institution] Dankook University Industry-Academic Cooperation Foundation

[Period] 2014.05.01.~2017.04.30.

Figure 2:
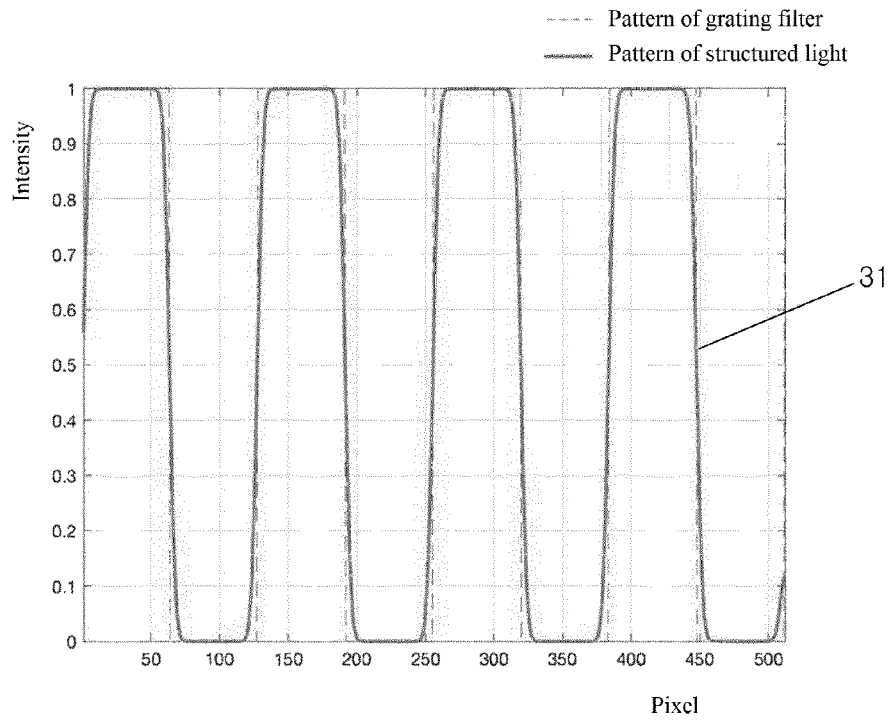
FIG. 2 to FIG. 4 are views illustrating a structured light formation step of the 3D profile measurement method of FIG. 1.
Figure 2:
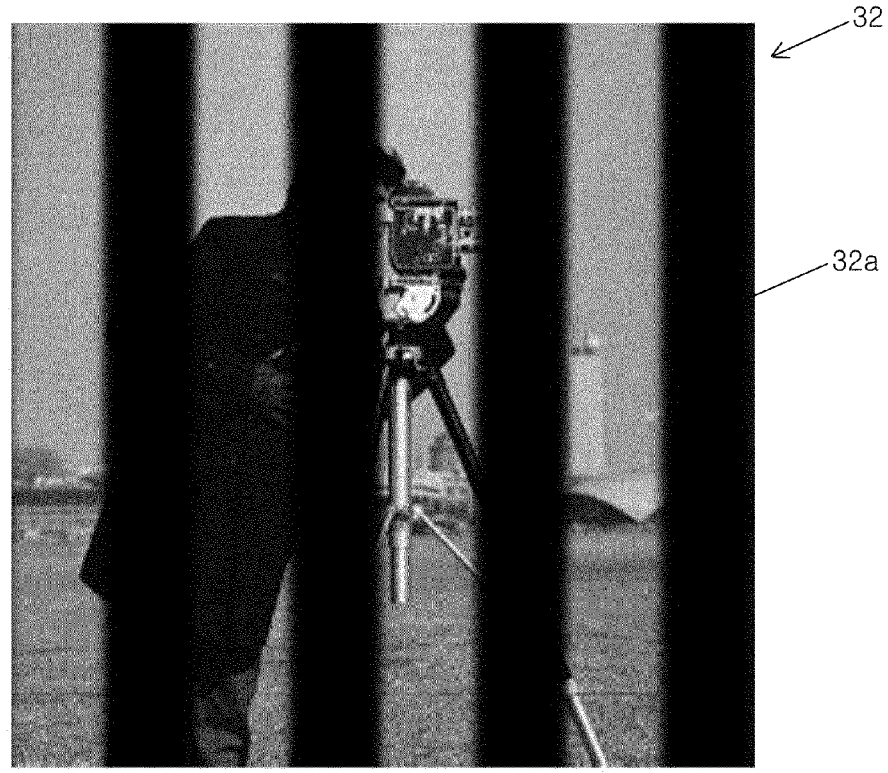
Figure 3:
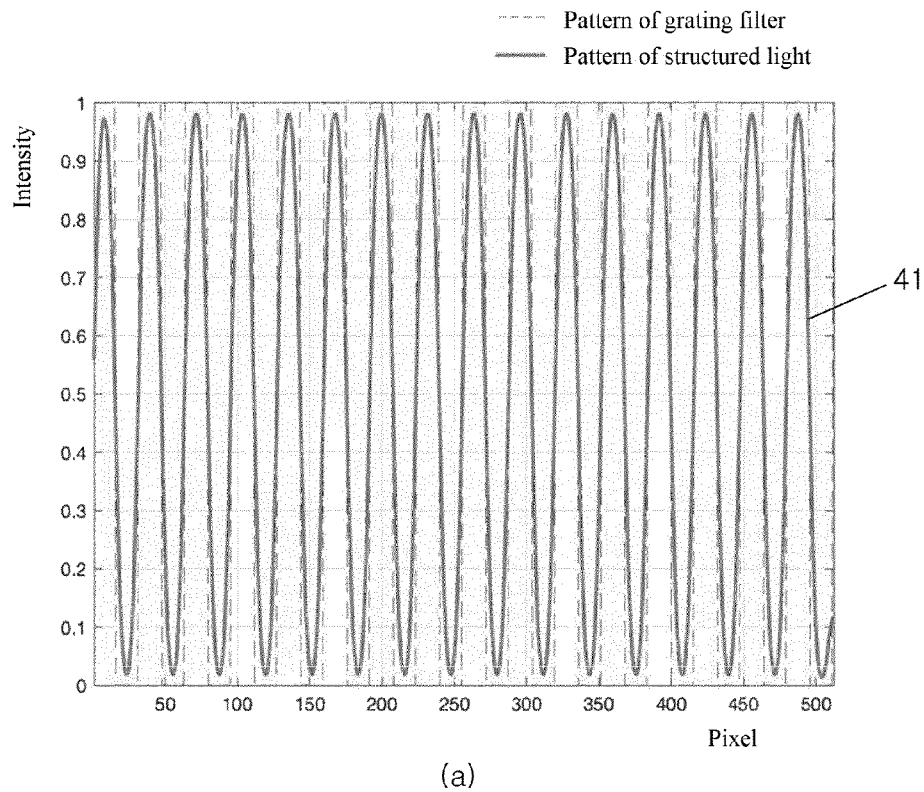
Figure 3:
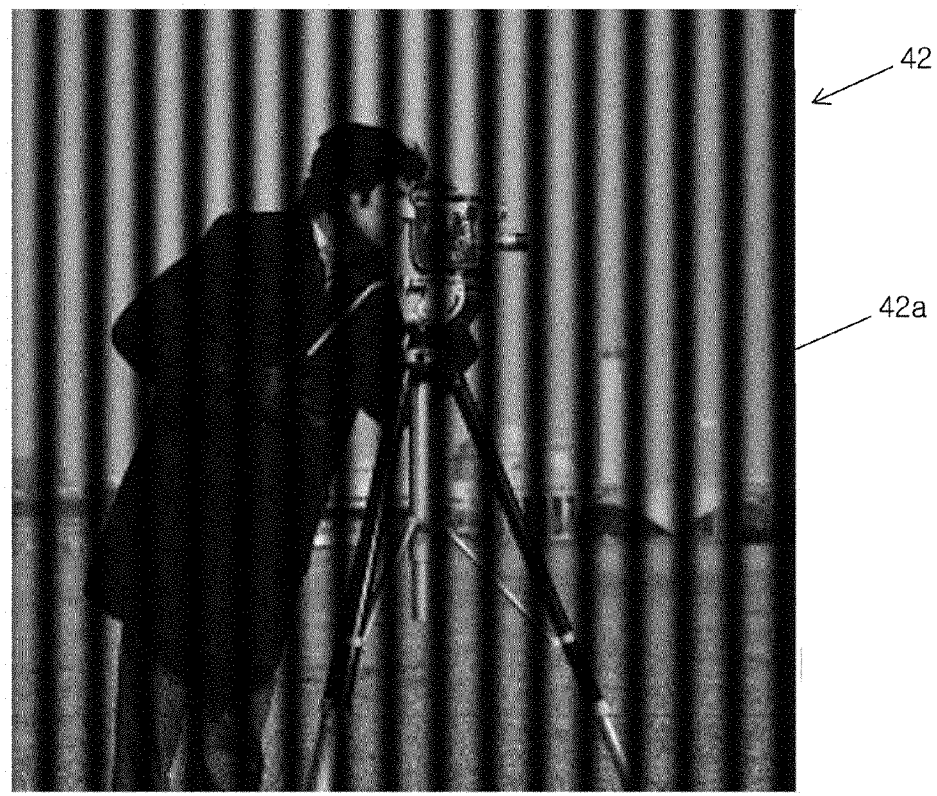
Figure 4:
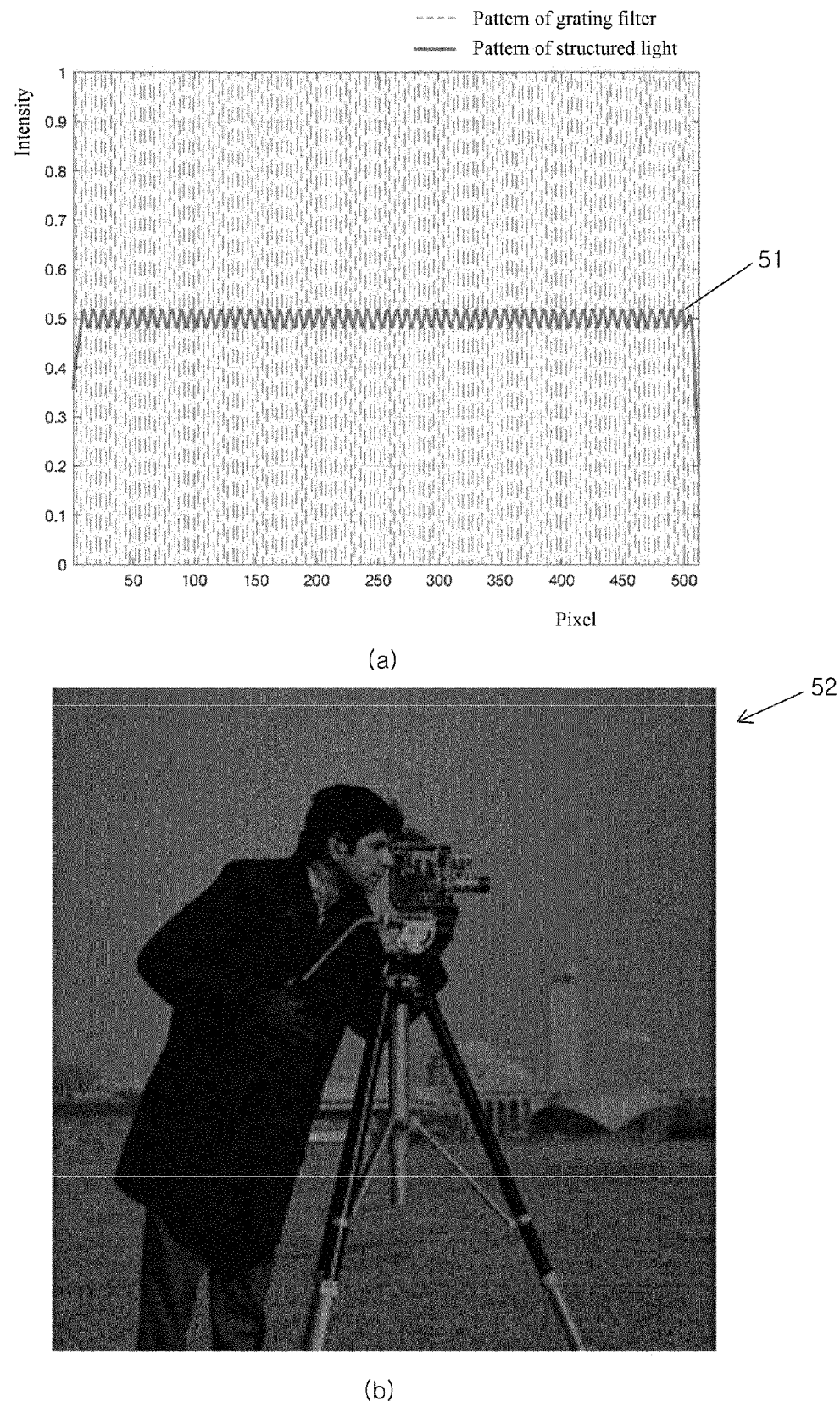
Figure 5:
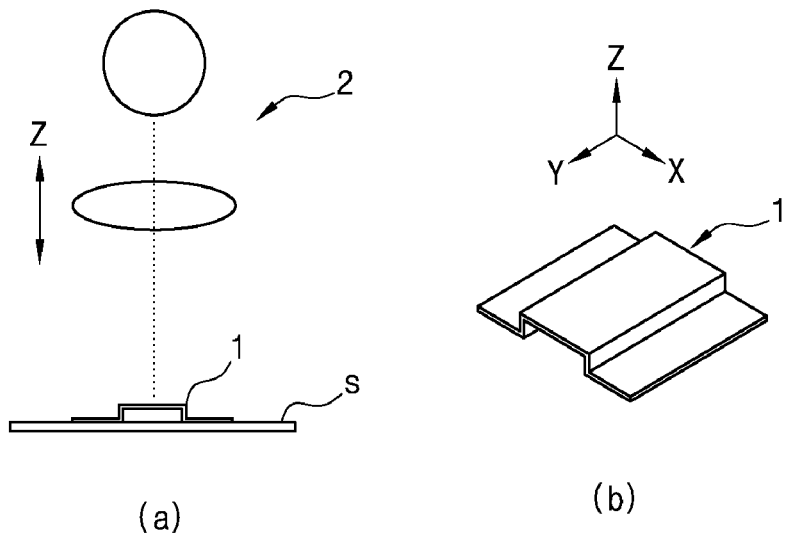
FIG. 5 is a conceptual view of a measurement apparatus and a measurement object to illustrate the 3D profile measurement method of FIG. 1.
Figure 6:
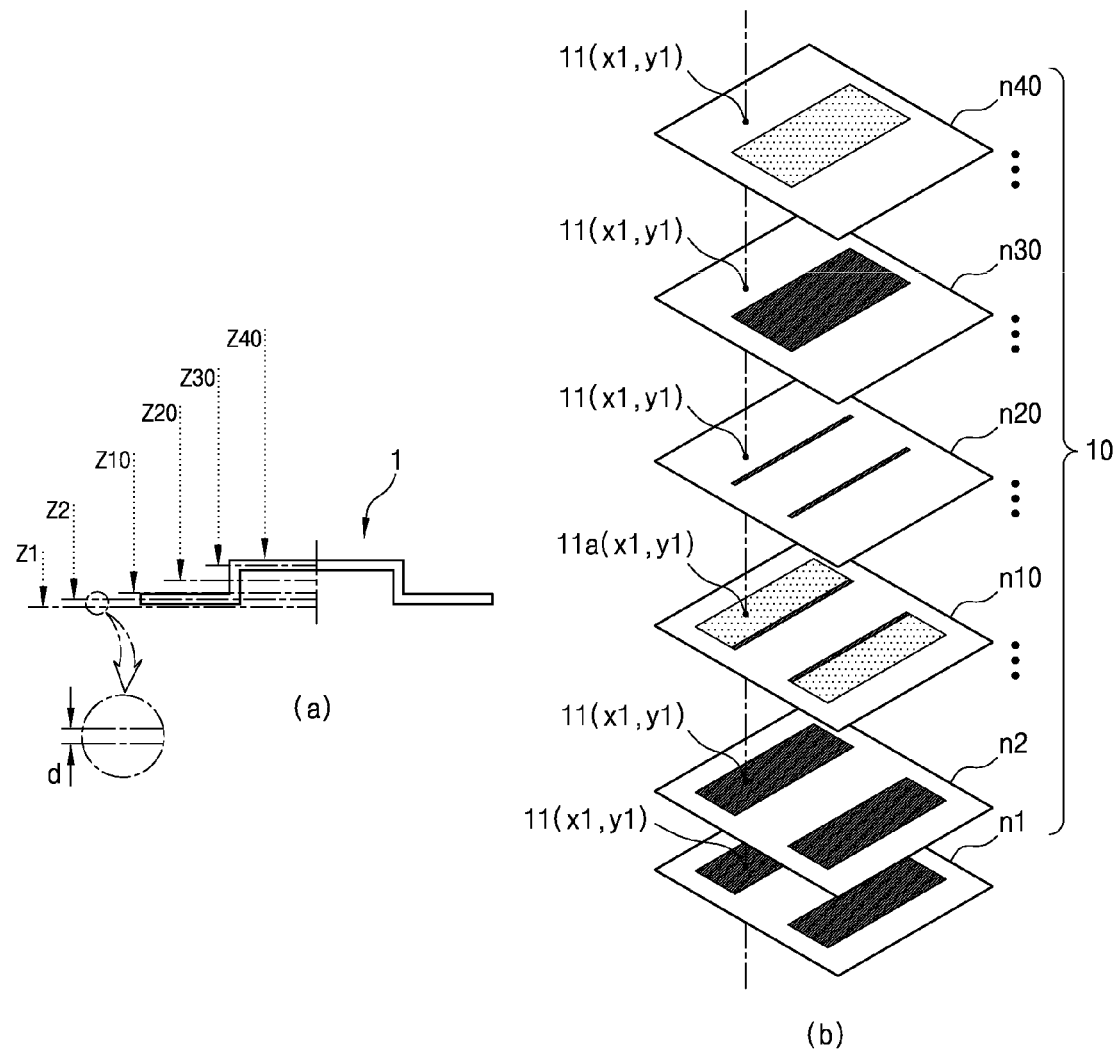
FIG. 6 is a view illustrating an image acquisition step of the 3D profile measurement method of FIG. 1.
Figure 7:
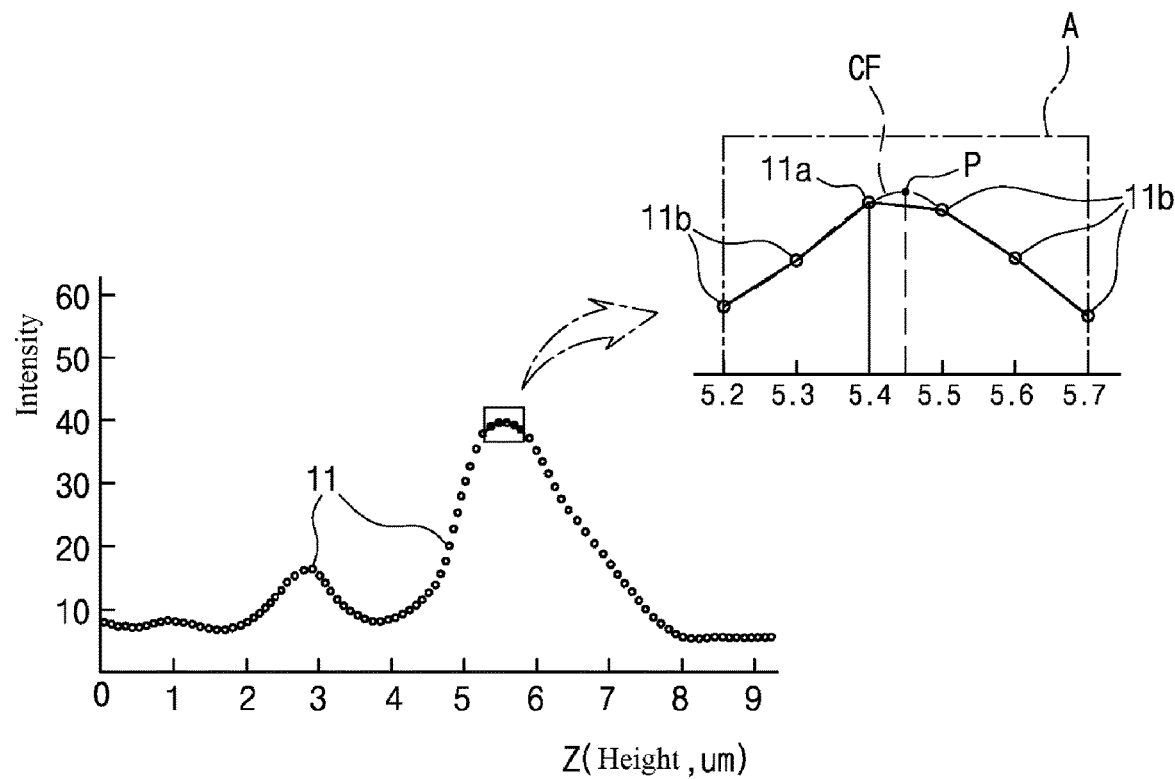
FIG. 7 is a view illustrating a surface position determination step of the 3D profile measurement method of FIG. 1.
Figure 8:
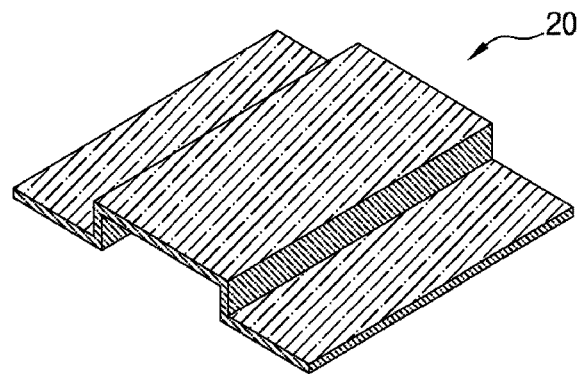
FIG. 8 is a 3D image of a measurement object generated through a profile generation step of the 3D profile measurement method of FIG. 1.

FIG. 1 is a flowchart of a 3D profile measurement method according to one embodiment of the present invention, FIG. 2 to FIG. 4 are views illustrating a structured light formation step of the 3D profile measurement method of FIG. 1, FIG. 5 is a conceptual view of a measurement apparatus and a measurement object to illustrate the 3D profile measurement method of FIG. 1, FIG. 6 is a view illustrating an image acquisition step of the 3D profile measurement method of FIG. 1, FIG. 7 is a view illustrating a surface position determination step of the 3D profile measurement method of FIG. 1, and FIG. 8 is a 3D image of a measurement object generated through a profile generation step of the 3D profile measurement method of FIG. 1.

Referring to FIG. 1 to FIG. 8, a 3D profile measurement method according to one embodiment of the invention includes: a structured light formation step S110; an image acquisition step S120; a HI-Lo image generation step S130; a surface position determination step S140; a profile generation step S150; a measurement error correction step S160; and a leveling correction step S170.

In the structured light formation step S110, structured light 41 having a sinusoidal intensity pattern is formed by forcing light to pass through a grating filter and an objective lens 400.

Referring to FIG. 2 to FIG. 4, the intensity pattern of the structured light projected on a measurement object may vary depending on the pattern pitch of the grating filter through which light passes and the design specification of the objective lens 400. For example, if the pattern pitch of the grating filter is relatively large, structured light 31 having an incomplete sinusoidal intensity pattern is formed, as shown in FIG. 2(a). If the pattern pitch of the grating filter is relatively small, structured light 41 having a complete sinusoidal intensity pattern is formed, as shown in FIG. 3(a).

In the present invention, the structured light 41 having a complete sinusoidal intensity pattern as shown in FIG. 3(a) is used.

A structured illumination image 32 of the measurement object acquired using the structured light 31 having an incomplete sinusoidal intensity pattern as shown in FIG. 2(a) has an intensity of zero in a dark region 32a, making it impossible to obtain image data of the dark region 32a in the structured illumination image 32.

If such a structured illumination image 32 having no image data of the dark region 32a is used in the process of generating a Hi-Lo image based on a structured illumination image acquired using the structured light and a uniform illumination image acquired using general light, image data of an out-of-focus portion in a Lo image is not properly removed, causing a final Hi-Lo image to contain a lot of noise and thus resulting in reduction in 3D resolution.

On the other hand, a structured illumination image 42 of the measurement object acquired using the structured light 41 having a complete sinusoidal intensity pattern as shown in FIG. 3(a) has small, but non-zero, intensity in the dark region 42a, thereby allowing acquisition of image data of the dark region 42a in the structured illumination image 42. That is, despite looking black, the dark region 42a in the structured illumination image 42 of FIG. 3 contains image data since the structured light 41 having non-zero intensity is projected thereon.

Therefore, use of the structured illumination image 42 containing image data in the dark region 42a allows efficient removal of image data of an out-of-focus portion in the process of generating a Lo image, thereby allowing minimization of noise in a final Hi-Lo image and increase in 3D resolution.

A Hi-Lo imaging technique capable of acquiring a Hi-Lo image is well known to those skilled in the art and thus detailed description thereof will be omitted.

On the other hand, as shown in FIG. 4(a), structured light 51 that has excessively low contrast despite having a complete sinusoidal intensity pattern can be formed depending on the pattern pitch of the grating filter. The structured light 41 of FIG. 3(a) has a contrast of approximately 1.0, whereas the structured light 51 of FIG. 4(a) has a contrast of approximately 0.05.

As shown in FIG. 4(a), a structured illumination image 52 acquired using the structured light 51 having excessively low contrast inevitably has a blurry structured illumination pattern, making it impossible to utilize the Hi-Lo imaging technique.

Therefore, although it is also important to form the structured light 41 having a sinusoidal intensity pattern, it is desirable that the structured light 41 have a contrast higher than a predetermined value.

In this embodiment, the structured light 41 preferably has a contrast of 0.6 or higher. If the contrast of the structured light is less than 0.6, a structured illumination pattern is not properly formed in the structured illumination image, as described above, making it difficult to use the structured illumination image.

According to this embodiment, in the structured light formation step S110, the pattern pitch of the grating filter may be adjusted to form the structured light 41 having a sinusoidal intensity pattern. For example, if it is ascertained that the structured light 31 having an incomplete sinusoidal intensity pattern as shown in FIG. 2(a) is formed, the pattern pitch of the grating filter may be reduced to form the structured light 41 having a complete sinusoidal intensity pattern as shown in FIG. 3(a).

In addition, a magnification and numerical aperture of the objective lens 400 may be adjusted to form the structured light 41 41 having a sinusoidal intensity pattern. That is, the structured light 41 having a complete sinusoidal intensity profile can be formed by increasing or reducing the magnification and numerical aperture of the objective lens 400. For example, if it is ascertained that the structured light 31 having an incomplete sinusoidal intensity pattern as shown in FIG. 2(a) is formed, the structured light 31 as shown in FIG. 2(a) can be changed into the structured light having a complete sinusoidal intensity pattern by increasing the magnification of the objective lens 400 or reducing the numerical aperture of the objective lens 400 without adjustment of the pattern pitch of the grating filter.

In the image acquisition step S120, a structured illumination image of the measurement object 1 is acquired by photographing the measurement object 1 with the structured light 41 projected thereon at predetermined intervals in a height direction Z of the measurement object 1 and a uniform illumination image of the measurement object 1 is acquired by photographing the measurement object 1 under illumination with general light rather than the structured light.

Referring to FIG. 5, a measurement apparatus 2 adapted to emit light onto the measurement object 1 and acquire an image of the measurement object 1 may include a Hi-Lo microscope, a total internal reflection microscope, a video-rate confocal microscope, and a selective plane illumination microscope, which are known in the art. Preferably, the measurement apparatus is a Hi-Lo microscope.

The Hi-Lo microscope is a large-area image-based technology of acquiring a high-resolution 3D image through signal processing of plural large-area images with a grating filter applied thereto, and can achieve high resolution comparable to that achieved by typical laser scanning confocal microscopes while having faster processing speed than such confocal microscopes.

In addition, upon measurement of a surface profile of the measurement object 1 using reflected light rather than fluorescent light, the Hi-Lo microscope can significantly shorten image acquisition time despite the disadvantage of difficulty in high-speed acquisition of plural images due to a need to replace the grating filter.

Further, the Hi-Lo microscope can simultaneously acquire an image under light passing through the grating filter and an image under light not passing through the grating filter using a camera provided with a band-pass filter by simultaneously emitting at least two light components having different wavelengths onto the measurement object 1 and disposing a preselected grating filter in a path of one of the at least two light components. Thus, upon 3D profile measurement rather than fluorescence image acquisition, even when plural light components having different wavelengths are simultaneously radiated onto the measurement object 1, it is possible to separate and detect reflected light components having the same wavelength as the corresponding incident light components without interference or deformation. As such, eliminating a need to physically move the grating filter of the Hi-Lo microscope can significantly shorten image acquisition time and, furthermore, can achieve real-time image acquisition.

In this embodiment, the Hi-Lo microscope as described above is used to acquire both the structured illumination image of the measurement object by photographing the measurement object with the structured light having a complete sinusoidal intensity pattern projected thereon and a uniform illumination image of the measurement object by photographing the measurement object under illumination with general light, that is, light not passing through the grating filter, rather than the structured light.

Then, an optical focal plane may be moved stepwise by a predetermined distance d in the height direction Z with respect to the measurement object 1 seated on a stage 1. That is, plural structured illumination images and plural uniform illumination images may be acquired from reflected light components at respective cross-sectional heights of the measurement object while stepwise moving the optical focal plane from Z1 to Z2, . . . Z10, . . . Z20, . . . Z30, and . . . Z40 by the predetermined distance d.

The measurement apparatus 2 emitting light onto the measurement object 1 may have an optical axis parallel to the z-axis direction, that is, the height direction of the measurement object 1, in which the focal plane may be moved along the optical axis using an optical system of the measurement apparatus 2.

That is, the focal plane may be moved in the height direction from a surface of the stage S regardless of a surface of the measurement object 1 so as to acquire the plural structured illumination images and uniform illumination images of the measurement object 1.

For example, the focal plane may be moved by moving the objective lens 400 along the optical axis. Here, an actuator, such as a piezo positioner and a linear stage, may be used to move the objective lens 400 along the optical axis. For example, the actuator may be set to allow fine movement of the objective lens, that is, to allow the objective lens to have a position error less than 0.01 μm within the movement range of 0 μm to 190 μm. However, it should be understood that the movement range and movement distance of the objective lens are not particularly limited.

Herein, the predetermined distance d corresponds to a distance d between two images neighboring each other in the height direction, and may range, for example, from 0.1 μm to 1 μm. However, it should be understood that the predetermined distance d may be varied depending on the height profile of the measurement object 1.

If the distance d is relatively large, the number of acquired images is relatively small. As a result, digital post-processing of the acquired images described below can be performed more quickly, thereby allowing total inspection of the measurement object 1 or significant reduction in inspection time.

If the distance d is relatively small, the number of acquired images is relatively large. As a result, measurement accuracy can be improved although it takes a relatively long time to perform digital post-processing described below.

In the Hi-Lo image generation step S130, a Hi-Lo image is generated using the structured illumination image and the uniform illumination image at each height of the measurement object.

As shown in FIG. 6(b), plural Hi-Lo images 10 corresponding to n1, n2, . . . n10, . . . n20, . . . n30, . . . n40 may be acquired at respective heights of the measurement object by performing signal processing of the structured illumination image and the uniform illumination image acquired at each height of the measurement object so as to utilize the Hi-Lo imaging technique.

In the surface position determination step S140, height-specific intensity of respective pixels in the plural Hi-Lo images 10, which are located at the same point in a given plane (X, Y) in the height direction Z, is extracted and a height corresponding to the highest intensity value is determined as a surface position of the measurement object.

A pixel 11a at a focused height is bright and clear and thus has a relatively high light intensity, whereas a pixel 11 at an unfocused height is dark and blurry and thus has a relatively low light intensity.

Thus, a clear image can be acquired in an actual focal plane by eliminating pixels that are out of focus and thus are relatively blurry and extracting pixels that are in focus and thus are relatively clear, among the respective pixels 11 in the plural Hi-Lo images, which are located at the same point (x1, y1) in the given plane (X, Y) in the height direction.

In order to extract intensity of each pixel 11, a known image sensor such as a complementary metal oxide semiconductor (CMOS), a charged coupled device (CCD), a photo detector (PD), an avalanche photodiode (APD), and a photo multiplier tube (PMT) may be used.

Referring to FIG. 7, after extracting the intensity of each of the plural pixels 11 located at the same point (x1, y1) in the given plane (X, Y) in the height direction Z, the height (5.4 μm) of a first pixel having the highest intensity value among the plural pixels 11, intensity of which has been extracted, may be determined as the surface position of the measurement object 1.

However, in this embodiment, it is preferable to perform curve fitting (CF). For example, after extracting the height-specific intensity of the pixels 11 located at the same point (x1, y1) in the given plane (X, Y) in the height direction Z, curve fitting (CF) may be performed on the extracted height-specific intensity values, followed by determining a height (5.45 μm) corresponding to a point having the highest intensity value P in a height-specific intensity curve obtained by curve fitting (CF) as the surface position of the measurement object 1.

Without curve fitting, if an actual surface position of the measurement object 1 is between neighboring images 10, an error may occur since the height of the first pixel 11a having the highest intensity value is different from the actual surface position of the measurement object 1.

According to present invention, through curve fitting of the intensity values of neighboring pixels 11 into a continuous curve, more accurate surface position determination can be achieved even when an actual surface position of the measurement object 1 is between neighboring images 10, that is, is located in a distance d interval between the neighboring images 10.

Although there is a way of reducing error between the height of the first pixel 11a having the highest intensity value and an actual surface position of the measurement object 1 based on a larger number of Hi-Lo images 10 acquired by decreasing the inter-image 10 distance d, this method has a problem in that it takes a considerable time to perform data processing of the Hi-Lo images 10.

According to the present invention, since the surface position of the measurement object 1 is obtained through curve fitting, a more precise and higher-resolution 3D profile can be acquired quickly without a need for a large number of Hi-Lo images 10.

Here, curve fitting for reducing error related to the surface position of the measurement object 1 may be performed by any suitable method known in the art, such as linear and nonlinear regression, linear and nonlinear interpolation, and smoothing.

In the surface position determination step S140, a height corresponding to the highest intensity value 11a among the heights, the intensity of which has been extracted, may be selected as a highest intensity height, and then curve fitting may be performed on the intensity value 11a at the highest intensity height and intensity values at a predetermined number of heights adjacent to and above and below the highest intensity height.

When curve fitting is performed on all the height-specific intensity values of innumerable pixels 11 in innumerable Hi-Lo images 10, it takes a lot of time to perform digital processing.

According to the present invention, in view of the fact that the focal plane is formed at a location close to the surface position of the measurement object 1, curve fitting is performed only in a predetermined region A around the first pixel 11a having the highest intensity value, thereby allowing faster digital processing.

For example, curve fitting may be performed on 5 to 10 height-specific intensity values close to and above and below the intensity value of the first pixel 11a in the height direction.

In the profile generation step S150, a 3D profile of the measurement object is generated based on the obtained surface position.

Referring to FIG. 8, the profile generation step S150 is a process of generating a final 3D image 20 of the measurement object 1 using surface position data acquired in the surface position determination step S140.

In use under conditions requiring precise alignment, the measurement apparatus including the optical system can exhibit different operational characteristics even using the same camera or image sensor product. Therefore, it is necessary to consider this fact.

For this purpose, the 3D profile measurement method according to the present invention may include the measurement error correction step S160 performed to correct a measurement error related to the 3D image 20 of the measurement object 1 generated through the structured light formation step S110, the image acquisition step S120, the Hi-Lo image generation step S130, the surface position determination step S140 and the profile generation step S150.

Figure 9:
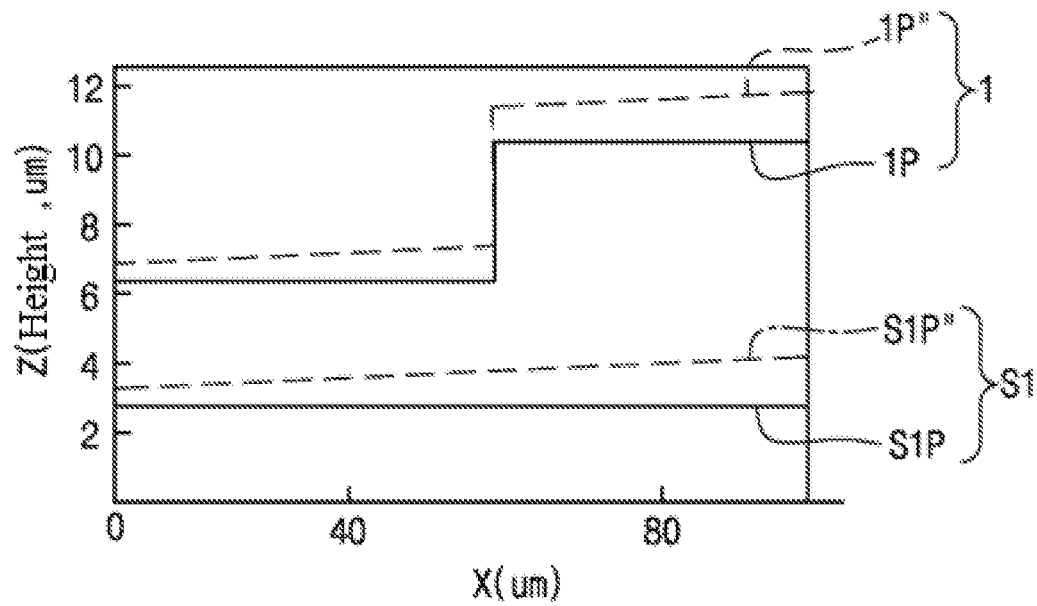
FIG. 9 is a view illustrating a measurement error correction step of the 3D profile measurement method of FIG. 1.

FIG. 9 is a view illustrating the measurement error correction step of the 3D profile measurement method of FIG. 1.

Referring to FIG. 9, the measurement error correction step S160 according to this embodiment may include: regenerating a 3D profile S1P'' of a standard measurement object 51, a 3D profile of which is known in advance, through the structured light formation step S110, the image acquisition step S120, the Hi-Lo image generation step S130, the surface position determination step S140, and the profile generation step S150; and, upon occurrence of an error between the regenerated 3D profile S1P'' and the known 3D profile S1P, determining that the error is due to operational characteristics of the measurement apparatus and correcting the 3D profile 1P'' of the measurement object 1 through application of a value of the error to the 3D profile 1P''.

In other words, if it is ascertained that a measurement error occurs in the regenerated 3D profile S1P'' of the standard measurement object 51 acquired through the light formation step S110, the image acquisition step S120, the Hi-Lo image generation step S130, the surface position determination step S140, and the profile generation step S150 through comparison with the known 3D profile S1P of the standard measurement object S1, the measurement error is determined to be due to operational characteristics of the measurement apparatus including the optical system.

Upon occurrence of an error between the known 3D profile S1P and the regenerated 3D profile S1P'' of the standard measurement object S1, a value of the error is applied to the measured profile 1P'' of the measurement object 1 to acquire an accurate profile 1P of the measurement object 1.

In addition to an error due to operational characteristics of the measurement apparatus as described above, upon measurement of a micrometer-sized measurement object 1, a 3D profile of the measurement object 1 may greatly change depending on the seated condition of the measurement object 1 with respect to the stage S. Therefore, it is necessary to consider this.

For example, even when fine foreign matter exists on an adhesive surface of the measurement object 1 contacting the measurement apparatus such as the stage, an inclination profile of the measurement object 1 can greatly change.

Figure 10:
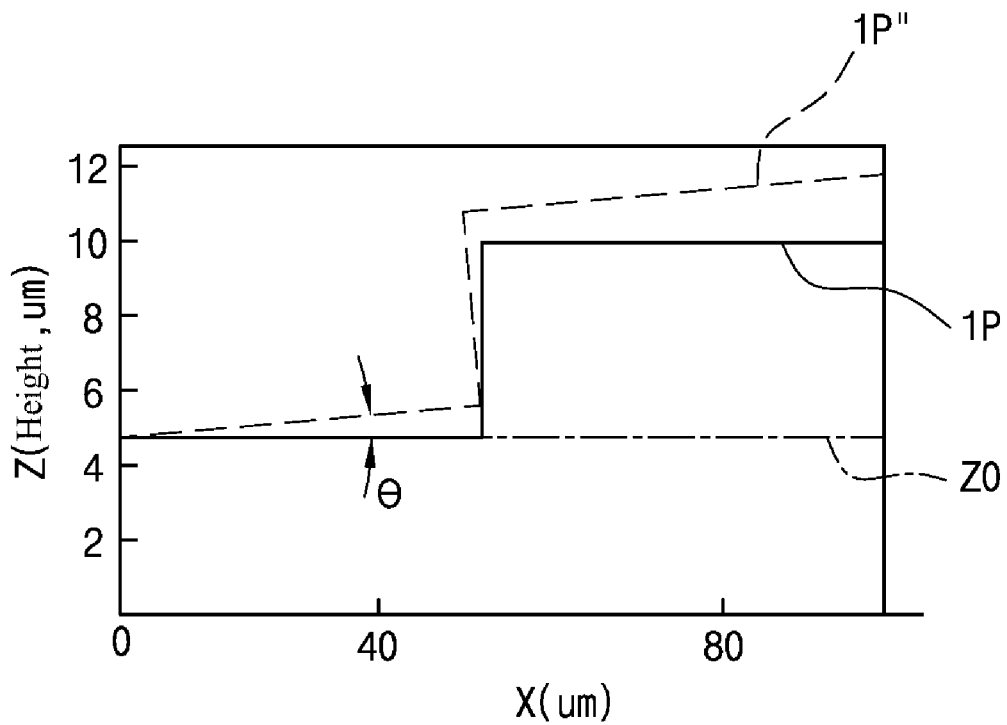
FIG. 10 is a view illustrating a leveling correction step of the 3D profile measurement method of FIG. 1.

FIG. 10 is a view illustrating the leveling correction step of the 3D profile measurement method of FIG. 1.

Referring to FIG. 10, in the leveling correction step S170 according to this embodiment, when the 3D profile 1P'' of the measurement object 1 is inclined at a certain angle θ with respect to a horizontal reference plane Z0 although it is ascertained in the measurement error correction step S160 that there is no error between the regenerated 3D profile and the known 3D profile, a determination is made that the measurement object 1 is in an incorrect measurement position, followed by reducing the angle of inclination to zero.

According to the present invention, through the measurement error correction step S160 and the leveling correction step S170 further performed, external defective factors such as effects of operational characteristics of the measurement apparatus or misplacement of the measurement object 1 can be eliminated, thereby allowing acquisition of a more accurate 3D profile of the measurement object 1.

In addition, the 3D profile measurement method according to the present invention may further include a 3D image correction step (S200) in which a 3D image generated based on first and second images of the same measurement object is corrected, wherein the first and second images are acquired by plural imaging units using first and second light sources that emit first and second wavelength light components having different wavelengths, respectively.

The 3D image correction step is performed after the image acquisition step S120. In the 3D image correction step, the 3D image is corrected using one of the first and second images as a reference image and the other image as a correcting image.

As described above, according to the present invention, at least two light components having different wavelengths are radiated onto the measurement object and a preselected grating filter is disposed in a path of one of the at least two light components, wherein the light components incident on the measurement object may be the first wavelength light component and the second wavelength light component, respectively. Therefore, even when plural light components having different wavelengths are simultaneously radiated onto the measurement object upon 3D profile measurement, it is possible to separate and detect reflected light components having the same wavelength as the corresponding incident light components without interference or deformation.

Next, the configuration of the measurement apparatus for acquisition of a 3D profile of the measurement object (hereinafter referred to as a "3D image acquisition apparatus") will be described.

Figure 12:
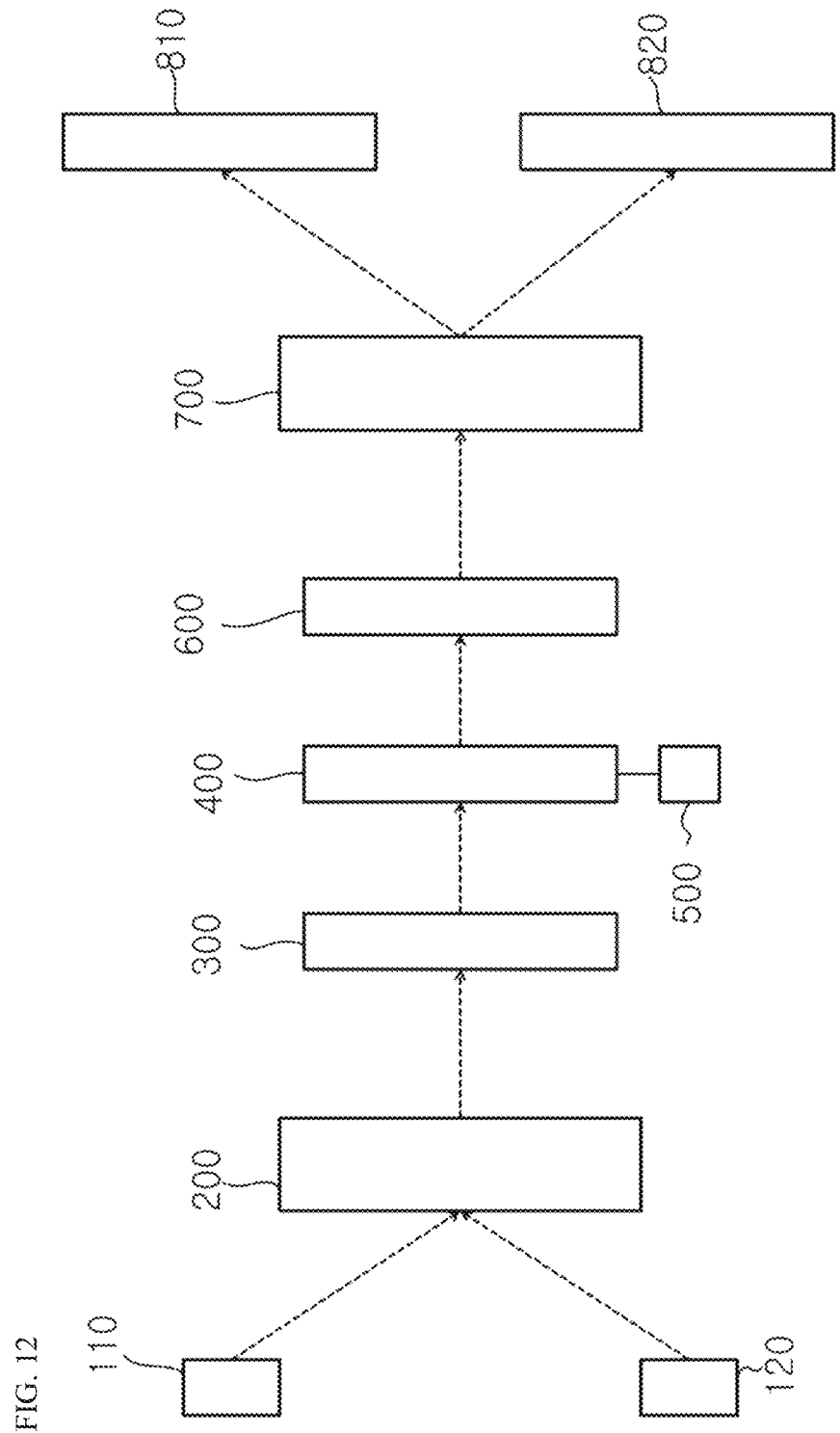
FIG. 12 is a diagram of an exemplary 3D image acquisition apparatus utilizing the 3D image correction step of the 3D profile measurement method of FIG. 12.

Referring to FIG. 12, the 3D image acquisition apparatus according to the present invention is an apparatus that emits light components having different wavelengths onto a measurement object having a 3D micro- or nanostructure and acquires a 3D image by combining reflected light components from the measurement object, and includes a light source, a beam combiner 200, a tube lens 300, an objective lens 400, an axial transfer unit 500, an imaging lens 600, a beam splitter 700, an imaging unit, and an image generation unit (not shown).

The light source emits plural light components having different wavelengths onto the measurement object having the 3D micro- or nanostructure. Specifically, the light source includes a first light source 110 and a second light source 120 that emit respective light components having different wavelengths onto the measurement object having the 3D micro- or nanostructure to generate reflected light components from the measurement object.

The beam combiner 200 allows the respective light components from the first light source 110 and the second light source 120 to travel along the same light path. The light components traveling along the same light path sequentially pass through the tube lens 300, the objective lens 400, and the imaging lens 600, and then are split into two images of different wavelengths in the beam splitter 700 to be delivered in perpendicular directions with respect to each other, that is, toward a first imaging unit 810 and a second imaging unit 820 included in the imaging unit. Here, the axial transfer unit 500 serves to transfer the objective lens 400 in an axial direction.

In the aforementioned process, correction is performed only once after an optical system of the imaging unit is completely fixed using a 2D resolution target. When there is a change in the optical system, correction is performed again.

The image generation unit generates a 3D image of the measurement object by combining the first image and the second image. Specifically, the image generation unit produces pixel-by-pixel data using a prestored calculation algorithm and combines the produced pixel-by-pixel data to acquire the 3D image of the measurement object.

With this arrangement, the 3D image acquisition apparatus according to the present invention can simultaneously acquire images to be combined through emission of the plural wavelength light components onto the measurement object, thereby shortening image acquisition time.

Figure 11:
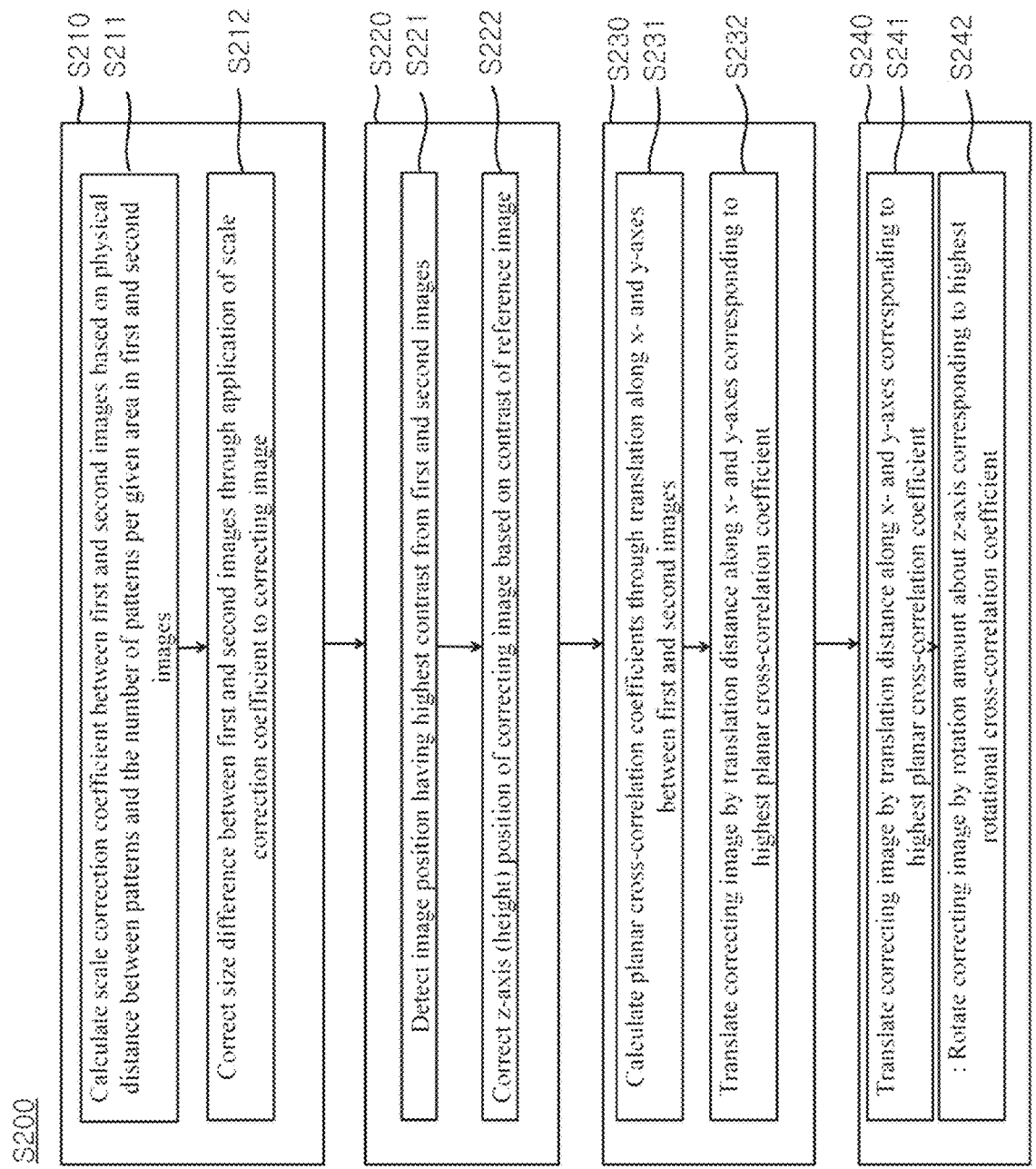
FIG. 11 is a flowchart of a 3D image correction step of the 3D profile measurement method according to one embodiment of the present invention.

Referring to FIG. 11, the multi-wavelength light source-based 3D image correction step according to the present invention includes a first correction step S210 to a fourth correction step S240. In the first correction step S210 to the fourth correction step S240, the first image and the second image are each a 2D image, and, among the first and second images, an image having a longer wavelength is used as a reference image and an image having a shorter wavelength is used as a correcting image. As used herein, the reference image refers to the first image and the correcting image refers to the second image.

First, in the first correction step S210, a size difference between the first image and the second image is corrected, wherein the size difference is due to a wavelength difference between the first wavelength light component and the second wavelength light component and an optical alignment error.

Specifically, the first correction step S210 includes a scale correction coefficient calculation step S211 and a scale correction step S212.

In the scale correction coefficient calculation step S211, equidistant stripe patterns, such as a Ronchi ruling, are formed on the first image and the second image, followed by calculation of a scale correction coefficient between the first image and the second image based on physical distance between the patterns and the number of patterns per given area in each of the first image and the second image. Here, the patterns may be implemented by utilizing structured illumination.

In the scale correction step S212, the size difference between the first image and the second image is corrected by applying the scale correction coefficient to the correcting image. That is, the second image is calibrated to the size of the first image.

In the second correction step S220, a difference in focus position is corrected, wherein the difference in focus position is due to a wavelength difference between the first wavelength light component and the second wavelength light component and an optical alignment error.

Specifically, the second correction step S220 includes a contrast detection step S221 and a contrast-based correction step S222.

In the contrast detection step S221, an image position having the highest contrast is detected from each of the first image and the second image.

In the contrast-based correction step S222, based on contrast of one of the first image and the second image, the z-axis (height) position of the other image is corrected.

In other words, the correcting image has the same contrast as the reference image by correcting the z-axis (height) position of the correcting image based on the contrast of the reference image.

In the third correction step S230, a difference in translational position between the first image and the second image due to an optical alignment error is corrected.

Specifically, the third correction step S230 includes a planar cross-correlation coefficient calculation step S231 and a translational position correction step S232.

In the planar cross-correlation coefficient calculation step S231, planar cross-correlation coefficients through translation along the x- and y-axes between the first image and the second image are calculated.

In the translational position correction step S232, the correcting image is translated by a translation distance along the x- and y-axes corresponding to the highest planar cross-correlation coefficient among the calculated planar cross-correlation coefficients to allow the reference image (the first image) and the correcting image (the second image) to be superimposed on each other without misalignment.

In the fourth correction step S240, a difference in rotational position between the first image and the second image due to an optical alignment error is corrected.

Specifically, the fourth correction step S240 includes a rotational cross-correlation coefficient calculation step S241 and a rotational position correction step S242.

In the rotational cross-correlation coefficient calculation step S241, rotational cross-correlation coefficients through rotation about the z-axis between the first image and the second image are calculated.

In the rotational position correction step S242, the correcting image is rotated by a rotation amount about the z-axis corresponding to the highest rotational cross-correlation coefficient among the calculated rotational cross-correlation coefficients to allow the reference image (the first image) and the correcting image (the second image) to have the same rotational position.

After the first to fourth correction steps, the first image and the second image may be combined to acquire a high-resolution 3D image without interference with a sample.

As described above, the 3D profile measurement method according to the present invention allows high-speed measurement of a more precise and higher-resolution 3D profile than typical optical microscopes using a relatively small number of 2D images, thereby allowing total inspection of mass-produced large-area measurement objects 1 while significantly shortening inspection time.

In addition, the 3D profile measurement method according to the present invention allows measurement of a more precise 3D profile than typical optical microscopes and can achieve desired levels of precision and resolution comparable to those achieved by a confocal microscope (LSCM), which is known as a high-precision device.

Further, a typical confocal microscope can cost more than 100 million won depending on the performance of a laser provided thereto, whereas a Hi-Lo microscope using an existing optical microscope and image sensor can be implemented at a relatively low cost of about 10 to 20 million won. Therefore, application of the 3D profile measurement method according to the present invention to such a relatively inexpensive optical system also allows improvement in price competitiveness.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

LIST OF REFERENCE NUMERALS

1: Measurement object
10: Hi-Lo image
11: Pixel
110: First light source
120: Second light source
200: Beam combiner
300: Tube lens
400: Objective lens
500: Axial transfer unit
600: Imaging lens
700: Beam splitter
810: First imaging unit
820: Second imaging unit

What is claimed is:

1. A 3D profile measurement method comprising:
a structured light formation step in which structured light having a sinusoidal intensity pattern is formed by forcing light to pass through a grating filter and an objective lens;
an image acquisition step in which a structured illumination image of a measurement object is acquired by photographing the measurement object with the structured light projected thereon at predetermined intervals in a height direction of the measurement object and a uniform illumination image of the measurement object is acquired by photographing the measurement object under illumination with general light rather than the structured light;
a Hi-Lo image generation step in which a Hi-Lo image is generated using the structured illumination image and the uniform illumination image at each height of the measurement object;
a surface position determination step in which height-specific intensity of respective pixels in the plural Hi-Lo images is extracted, the pixels being located at the same point in a given plane in the height direction, and a height corresponding to the highest intensity value is determined as a surface position of the measurement object; and
a profile generation step in which a 3D profile of the measurement object is generated based on the obtained surface position.

2. The 3D profile measurement method according to claim 1, wherein the structured light formation step comprises adjusting a pattern pitch of the grating filter to form the structured light having the sinusoidal intensity pattern.

3. The 3D profile measurement method according to claim 1, wherein the structured light formation step comprises adjusting a magnification or numerical aperture of the objective lens to form the structured light having the sinusoidal intensity pattern.

4. The 3D profile measurement method according to claim 1, wherein the structured light having the sinusoidal intensity pattern has a contrast of 0.6 or more.

5. The 3D profile measurement method according to claim 1, wherein the surface position determination step comprises performing curve fitting on the extracted height-specific intensity values and determining a height corresponding to a point having the highest intensity value on a curve obtained by curve fitting as the surface position of the measurement object.

6. The 3D profile measurement method according to claim 5, wherein the surface position determination step comprises selecting a height corresponding to the highest intensity value among the heights, the height-specific intensity of which is extracted, as a highest intensity height, and performing curve fitting on an intensity value at the highest intensity height and intensity values at a predetermined number of plural heights adjacent to and above and below the highest intensity height.

7. The 3D profile measurement method according to claim 1, further comprising:
a measurement error correction step in which a 3D profile of a standard measurement object, a 3D profile of which is known in advance, is regenerated through the structured light formation step, the image acquisition step, the Hi-Lo image generation step, the surface position determination step, and the profile generation step; and, upon occurrence of an error between the regenerated 3D profile and the known 3D profile, a determination is made that the error is due to operational characteristics of a measurement apparatus and the 3D profile of the measurement object is corrected through application of a value of the error to the 3D profile of the measurement object.

8. The 3D profile measurement method according to claim 1, further comprising:
a leveling correction step in which, when the 3D profile of the measurement object is inclined at a certain angle with respect to a horizontal reference plane, a determination is made that the measurement object is in an incorrect measurement position and the angle of inclination is reduced to zero.

9. The 3D profile measurement method according to claim 1, further comprising:
a 3D image correction step in which a 3D image generated based on first and second images of the same measurement object is corrected, the first and second images being formed by plural imaging units using respective light sources emitting first and second wavelength light components having different wavelengths,
wherein the 3D image correction step comprises:
a first correction step in which a size difference between the first and second images due to a wavelength difference between the first and second wavelength light components and an optical alignment error is corrected;
a second correction step in which a difference in focus position between the first and the second images due to a wavelength difference between the first and second wavelength light components and an optical alignment error is corrected;
a third correction step in which a difference in translational position between the first and second images due to the optical alignment error is corrected; and
a fourth correction step in which a difference in rotational position between the first and the second images due to the optical alignment error is corrected.

10. The 3D profile measurement method according to claim 9, wherein the first correction step comprises:
a scale correction coefficient calculation step in which a scale correction coefficient between the first and second images is calculated based on physical distance between patterns and the number of patterns per given area in each of the first and second images; and
a scale correction step in which the size difference between the first and second images is corrected by applying the scale correction coefficient to one of the first and second images.

11. The 3D profile measurement method according to claim 9, wherein the second correction step comprises:
a contrast detection step in which an image position having the highest contrast is detected from each of the first and second images; and
a contrast-based correction step in which a z-axis (height) position of one of the first and second images is corrected based on a contrast of the other image.

12. The 3D profile measurement method according to claim 9, wherein the third correction step comprises:
a planar cross-correlation coefficient calculation step in which planar cross-correlation coefficients through translation along the x- and y-axes between the first and second images are calculated; and
a translation position correction step in which one of the first and second images is translated by a translation distance along the x- and y-axes corresponding to a planar cross-correlation coefficient having the highest value among the calculated planar cross-correlation coefficients.

13. The 3D profile measurement method according to claim 9, wherein the fourth correction step comprises:
a rotational cross-correlation coefficient calculation step in which rotational cross-correlation coefficients through rotation about the z-axis between the first and second images are calculated; and
a rotational position correction step in which one of the first and second images is rotated by a rotation amount about the z-axis corresponding to a rotational cross-correlation coefficient having the highest value among the calculated rotational cross-correlation coefficients.

* * * * *